(12) United States Patent
Fujihara et al.

(10) Patent No.: US 10,573,440 B2
(45) Date of Patent: Feb. 25, 2020

(54) RARE-EARTH PERMANENT MAGNET-FORMING SINTERED BODY, AND RARE-EARTH PERMANENT MAGNET OBTAINED BY MAGNETIZING SAID SINTERED BODY

(71) Applicant: NITTO DENKO CORPORATION, Osaka (JP)

(72) Inventors: Makoto Fujihara, Osaka (JP); Kenichi Fujikawa, Osaka (JP); Shoichiro Saito, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 77 days.

(21) Appl. No.: 15/771,125

(22) PCT Filed: Nov. 17, 2016

(86) PCT No.: PCT/JP2016/084105
§ 371 (c)(1),
(2) Date: May 1, 2018

(87) PCT Pub. No.: WO2017/086386
PCT Pub. Date: May 26, 2017

(65) Prior Publication Data
US 2018/0336981 A1    Nov. 22, 2018

(30) Foreign Application Priority Data

Nov. 19, 2015    (JP) .................. 2015-226577

(51) Int. Cl.
*H01F 1/08*    (2006.01)
*H01F 7/02*    (2006.01)
(Continued)

(52) U.S. Cl.
CPC .............. *H01F 1/086* (2013.01); *H01F 7/02* (2013.01); *H01F 41/0253* (2013.01); *H02K 1/02* (2013.01); *H02K 1/2706* (2013.01)

(58) Field of Classification Search
CPC ........ H01F 1/086; H01F 7/02; H01F 41/0253; H02K 1/02; H02K 1/27066
(Continued)

(56) References Cited

U.S. PATENT DOCUMENTS 4,602,232 A    7/1986  Umehara et al.
7,759,833 B2   7/2010  Yamashita et al.
(Continued)

FOREIGN PATENT DOCUMENTS

CN    101485065 A    7/2009
CN    103098354 A    5/2013
(Continued)

OTHER PUBLICATIONS

International Search Report dated Feb. 21, 2017, which issued during prosecution of International Application No. PCT/JP2016/084105.
(Continued)

*Primary Examiner* — Jermele M Hollington
*Assistant Examiner* — Rashad H Johnson
(74) *Attorney, Agent, or Firm* — Hauptman Ham, LLP

(57) ABSTRACT

This invention provides for a rare-earth permanent magnet-forming sintered body having an integral sintered structure of magnet material particles containing a rare-earth substance. The integral sintered structure is formed in a three-dimensional shape having: a cross-section with a shape defined by a radially outer-side arc-shaped surface having a first curvature radius, a radially inner-side arc-shaped surface having a second curvature radius less than the first curvature radius and having an arc shape concentric with the outer-side arc-shaped surface; and a first end face and a second end face each of which is a radially-extending face along a virtual radial line extending from a curvature center of the arc shapes; and an axial length extending in a direction perpendicular to the cross-section.

7 Claims, 7 Drawing Sheets

(51) Int. Cl.
*H01F 41/02* (2006.01)
*H02K 1/02* (2006.01)
*H02K 1/27* (2006.01)

(58) Field of Classification Search
USPC ........................................................ 310/156
See application file for complete search history.

(56) References Cited

U.S. PATENT DOCUMENTS

| | | | |
|---|---|---|---|
| 9,646,751 | B2 | 5/2017 | Yoshida et al. |
| 10,404,115 | B2* | 9/2019 | Kawasaki ............... H02K 21/16 |
| 2005/0076973 | A1 | 4/2005 | Masuzawa et al. |
| 2009/0127960 | A1* | 5/2009 | Kawamura ............ H02K 1/278 310/156.43 |
| 2009/0021097 | A1 | 6/2009 | Yamashita et al. |
| 2010/0066192 | A1* | 3/2010 | Yamashita ............. H02K 1/278 310/156.43 |
| 2013/0278367 | A1 | 10/2013 | Yoshida et al. |
| 2014/0210292 | A1* | 7/2014 | Martinek ............... G01D 5/145 310/156.01 |
| 2016/0380492 | A1* | 12/2016 | Kawasaki ............ H02K 1/2766 310/156.11 |
| 2018/0108464 | A1* | 4/2018 | Fujikawa ................ H01F 7/02 |
| 2018/0115205 | A1* | 4/2018 | Fujihara .................... H01F 7/02 |
| 2018/0159407 | A1* | 6/2018 | Yamashita ............ H02K 15/03 |
| 2019/0089216 | A1* | 3/2019 | Sano .................... H02K 1/2766 |
| 2019/0228888 | A1* | 7/2019 | Fujikawa ................. B22F 3/14 |

FOREIGN PATENT DOCUMENTS

| | | |
|---|---|---|
| CN | 103299381 A | 9/2013 |
| DE | 39 13 276 | 10/1990 |
| EP | 1326319 A2 | 7/2003 |
| EP | 1956698 A1 | 8/2008 |
| JP | 2000-195714 | 7/2000 |
| JP | 2000-269062 | 9/2000 |
| JP | 2002-134314 | 5/2002 |
| JP | 2004-207430 | 7/2004 |
| JP | 2004-208341 | 7/2004 |
| JP | 2005-44820 | 2/2005 |
| JP | 2015-153790 | 8/2015 |
| WO | 2012/090841 | 7/2012 |
| WO | 2013/175730 | 11/2013 |

OTHER PUBLICATIONS

The extended European Search Report for corresponding European application No. 16866387.0 dated Jul. 22, 2019, citing the above references.
Chinese Office Action dated Oct. 31, 2019 for corresponding Chinese Application No. 201680067820, citing the above references.

* cited by examiner

RARE-EARTH PERMANENT MAGNET-FORMING SINTERED BODY, AND RARE-EARTH PERMANENT MAGNET OBTAINED BY MAGNETIZING SAID SINTERED BODY

RELATED APPLICATIONS AND INCORPORATION BY REFERENCE

The present patent application is filed pursuant to 35 U.S.C. § 371 as a U.S. National Phase Application of International Patent Application No. PCT/JP2016/084105 filed Nov. 17, 2016, claiming the benefit of priority to Japanese Patent Application No. 2015-226577 filed Nov. 19, 2015. The International Application was published as WO 2017/086386 on May 26, 2017. The contents of each of the aforementioned patent applications are herein incorporated by reference in their entirety.

TECHNICAL FIELD

The present invention relates to a rare-earth permanent magnet-forming sintered body having an integrally sintered structure of magnet material particles (particles of a magnet material) containing a rare-earth substance, and a rare-earth permanent magnet obtained by magnetizing the rare-earth permanent magnet-forming sintered body. Further, the present invention relates to a rotary electric machine, such as an electric motor or a power generator, comprising a rotor in which a plurality of rare-earth permanent magnets each obtained by magnetizing the rare-earth permanent magnet-forming sintered body are arranged on a circular outer peripheral surface of a rotor core thereof with a given gap between opposed end faces of circumferentially-adjacent ones of the rare-earth permanent magnets. In particular, the present invention relates to a rare-earth permanent magnet usable in a rotary electric machine having a rotor with surface-arranged permanent magnets, and suited to configuring a polar-anisotropic ring magnet, and a rare-earth permanent magnet-forming sintered body for forming such a rare-earth permanent magnet.

BACKGROUND ART

A polar-anisotropic ring magnet means a magnet configured such that a magnetization direction of magnet material particles forming the magnet continuously changes along with a change in rotational angle, preferably, to achieve a sinusoidal wave-shaped surface magnetic flux distribution, and there has been known a polar-anisotropic ring magnet using, as the magnet material particles, alloy material particles containing a rare-earth substance, as disclosed, for example, in JP 2000-195714A (Patent Document 1) and JP 2000-269062A (Patent Document 2). A rare-earth magnet disclosed in the Patent Document 1 is a bonded magnet in which rare-earth magnet material particles are bonded together by a resin material, and a magnet disclosed in the Patent Document 2 is a sintered magnet.

In this type of polar-anisotropic ring magnet, there has been known a magnet structure intended to reduce cogging torque, as disclosed in JP 2004-207430A (Patent Document 3). According to the description of the Patent Document 3, a magnet using a NdFeB-based material which is a magnet material containing a rare-earth substance has a problem that, in an orientation step of orienting easy-to-magnetize axes of the magnet material particles and a sintering step of sintering the magnet material particles, variation in the orientation and anisotropy in thermal expansion coefficient occur, thereby leading to variance in the orientations of the easy-to-magnetize axes after the sintering. In order to address this problem, the Patent Document 3 proposes to, in the step of orienting the easy-to-magnetize axes of the magnet material particles, increase the intensity of a magnetic field to be applied to a pole position where an orientation direction of the easy-to-magnetize axes of the magnet material particles is directed in a radial direction of the ring magnet, and adjust a variation in angle between one pole position and an adjacent pole position of the ring magnet to be 10% or less.

As a means to reduce cogging torque, instead of this type of polar-anisotropic ring magnet, JP 2004-208341A (Patent Document 4) proposes to arrange a plurality of magnet pieces along an outer peripheral surface of a rotor, in a ring shape or in a spaced-apart relation to each other, wherein, in each of the magnet pieces as components, a surface thereof to be disposed to face a stator of a rotary electric machine is formed with a cross-section of an arcuate shape having a curvature greater than a curvature of the outer peripheral surface of the rotor, and the thickness of the magnet piece gradually decreases in a direction from a circumferential central region toward each circumferential edge of the magnet piece. Each of the magnet pieces described in the Patent Document 4 is disposed such that the arc-shaped surface thereof is opposed to a face of each of a plurality of stator teeth formed approximately linearly, i.e., a gap between the rotor-side magnet piece and the stator-side tooth is circumferentially unevenly formed, so that a surface magnetic flux around each of the circumferential edges of the magnet piece is reduced to thereby achieve reduction of cogging torque. However, this configuration is required to increase the gap between the stator and the rotor. Thus, there is a concern about a problem of degradation in magnet efficiency.

WO 2012/090841A (Patent Document 5) teaches controlling orientations of easy-to-magnetize axes of magnet material particles in a magnet unit having a structure in which a plurality of pillar-shaped rare-earth sintered magnets each having an arc-shaped cross-section are arranged in a circular cylindrical shape, to thereby achieve polar-anisotropic surface magnetic flux distribution. The teaching of the Patent Document 5 is to, among easy-to-magnetize axes of magnet material particles in a pillar-shaped magnet having an arc-shaped cross-section, orient easy-to-magnetize axes lying in a region adjacent to a circumferential end face of the magnet, in a direction perpendicular to the end face; orient easy-to-magnetize axes lying in a circumferential central region of a radially outer-side arc-shaped surface of the magnet, in a radial direction; and orient easy-to-magnetize axes lying in an intermediate region of the radially outer-side arc-shaped surface, in a direction along a curved line continuously extending from the orientation direction in the end face region to the orientation direction in the central region, thereby realizing a polar-anisotropic orientation in a magnet unit in which a plurality of the pillar-shaped magnets are arranged in a circular cylindrical shape. A pillar-shaped magnet having an arc-shaped cross-section and subjected to a similar orientation control is also disclosed in JP 2002-134314A (Patent Document 6) and JP 2005-044820A (Patent Document 7).

In the magnet unit as described in the Patent Documents 5 and 6, in which a plurality of pillar-shaped magnets each having an arc-shaped cross-section are arranged in a circular cylindrical shape, due to an inter-edge gap inevitably formed between opposed end faces of circumferentially-adjacent ones of the pillar-shaped magnets, a surface magnetic flux distribution is largely deviated from a sinusoidal-wave shape at a position of the inter-edge gap, so that it is difficult to sufficiently achieve the reduction of cogging torque.

CITATION LIST

Patent Document

Patent Document 1: JP 2000-195714A
Patent Document 2: JP 2000-269062A
Patent Document 3: JP 2004-207430A
Patent Document 4: JP 2004-208341A
Patent Document 5: WO 2012/090841A
Patent Document 6: JP 2002-134314A
Patent Document 7: JP 2005-044820A

SUMMARY OF INVENTION

Technical Problem

With a focus on the problem that, in the magnet unit in which a plurality of pillar-shaped magnets each having an arc-shaped cross-section are arranged in a circular cylindrical shape, as described in the Patent Documents 5 and 6, an inter-edge gap is inevitably formed between opposed end faces of circumferentially-adjacent ones of the pillar-shaped magnets, and thereby, at a position of the inter-edge gap, a surface magnetic flux distribution is largely deviated from a sinusoidal-wave shape, it is a primary object of the present invention to provide a pillar-shaped magnet with an arc-shaped cross-section, capable of solving this problem.

Solution to Technical Problem

The present invention is configured to, in a plurality of pillar-shaped magnets each having an arc-shaped cross-section, which are circumferentially arranged side-by-side on an outer peripheral surface of a rotor of a rotary electric machine through an inter-edge gap to form a polar-anisotropic ring magnet, deviating a magnetization direction in a given region at each of circumferentially-opposite ends of each of the pillar-shaped magnets, from a given polar-anisotropic orientation by a given angle to thereby enable a surface magnetic flux distribution profile at the circumferentially opposite ends to come closer to a sinusoidal wave. The present invention is directed to providing a rare-earth permanent magnet-forming sintered body for forming a rare-earth permanent magnet capable of achieving such a sinusoidal wave-shaped surface magnetic flux distribution, and a rare-earth permanent magnet obtained by magnetizing the sintered body.

Specifically, according to a first aspect of the present invention, there is provided a rare-earth permanent magnet-forming sintered body having an integral sintered structure of magnet material particles containing a rare-earth substance. The integral sintered structure is formed in a three-dimensional shape having: a cross-section with a shape defined by a radially outer-side arc-shaped surface having a first curvature radius, a radially inner-side arc-shaped surface having a second curvature radius less than the first curvature radius and having an arc shape concentric with the outer-side arc-shaped surface; and a first end face and a second end face each of which is a radially-extending face along a virtual radial line extending from a curvature center of the arc shapes; and an axial length extending in a direction perpendicular to the cross-section. In this sintered structure, each of the outer-side and inner-side arc-shaped surfaces has a circumferential length corresponding to an angular range $2\omega$ between the two virtual radial lines defining, respectively, the first and second circumferentially end faces. Further, the magnet material particles are oriented such that, their easy-to-magnetize axes are oriented, on a central radial line connecting the curvature center and a circumferential center point of the outer-side arc-shaped surface in a radially outward direction along the central radial line, easy-to-magnetize axes are further oriented, in a central region $2(1-\varepsilon)\omega$, excluding opposite end regions defined as two regions each extending over an angular region $\varepsilon\omega$ from a respective one of the first and second circumferentially end faces, at a position on an arbitrary radial line located at an angle $\theta$ from the central radial line, in a direction angularly displaced from a radially outward direction along the arbitrary radial line, toward the central radial line by an angle $\Phi$, and easy-to-magnetize axes are oriented in each of the end regions in a direction angularly displaced radially outwardly by an angle greater than the angle $\Phi$ by 5° or more. In this sintered structure, $\varepsilon$ denotes a value falling within the range of $0.1 \leq \varepsilon \leq 0.6$, and $\Phi$ denotes an angle determined based on the following formula: $\Phi=(90°-d)\cdot\theta/\omega$, where d denotes a constant set at an angle falling within the range of $0°<d\leq 5°$.

In one embodiment of the above rare-earth permanent magnet-forming sintered body, the orientation direction of the easy-to-magnetize axes of the magnet material particles in each of the end regions may be set based on the following formula: $\Phi=(1-\varepsilon)\cdot(90°-d)$. In another embodiment, the easy-to-magnetize axes of the magnet material particles in each of the end regions are oriented in a direction set based on the following formula: $\Phi=(1-\varepsilon)\cdot(90°-d)-(\Delta/(\varepsilon\cdot\omega))\cdot(\theta-(1-\varepsilon)\cdot\omega)$, where $\Delta$ denotes a constant falling within the following range: $0<\Delta\leq(1-\varepsilon)\cdot(90°-d)$.

In a rare-earth permanent magnet-forming sintered body according to yet another embodiment of the present invention, the easy-to-magnetize axes of the magnet material particles in each of the end regions are oriented in a direction set according the following formula: $\Phi=(90°-d)\cdot\theta/\omega-m\cdot(\theta/\omega-1+\eta)^n$, where m, n and $\eta$ denote, respectively, a constant falling within the following range: $0<m$, a constant falling within the following range: $1<n$, and a constant falling within the following range: $0.2\leq\eta\leq 0.9$.

According to another aspect of the present invention, there is provided a rare-earth permanent magnet obtained by magnetizing the rare-earth permanent magnet-forming sintered body having the feature of the first aspect of the present invention. According to a third aspect of the present invention, there is provided a rotary electric machine comprising a rotor in which a plurality of the above rare-earth permanent magnets are circumferentially arranged side-by-side on a circular outer peripheral surface of a rotor core thereof. According to a fourth aspect of the present invention, there is provided a rotary electric machine comprising a rotor in which a plurality of rare-earth permanent magnets each obtained by magnetizing the above rare-earth permanent magnet-forming sintered body are arranged on a circular outer peripheral surface of a rotor core thereof, with a gap between opposed circumferentially end faces being twice as large as the angle d.

Effect of Invention

In the present invention, easy-to-magnetize axes of magnet material particles in each of the end regions of the rare-earth permanent magnet-forming sintered body are oriented with a deviation from a polar-anisotropic orientation, as mentioned above, so that, even in the case where a plurality of permanent magnets each obtained by magnetizing the sintered body are arranged in a ring shape through an inter-end face gap, it becomes possible to enable a magnetic flux distribution in the vicinity of the inter-end face gap to come closer to a sinusoidal wave. This makes it possible to reduce cogging torque in a rotary electric machine using this permanent magnet.

BRIEF DESCRIPTION OF DRAWINGS

FIG. 8 is a schematic diagram depicting a production process of a permanent magnet-forming sintered body according to one embodiment of the present invention, wherein FIGS. 8(a) to 8(d) depict respective steps for forming a green sheet.

DESCRIPTION OF EMBODIMENTS

Figure 1A:
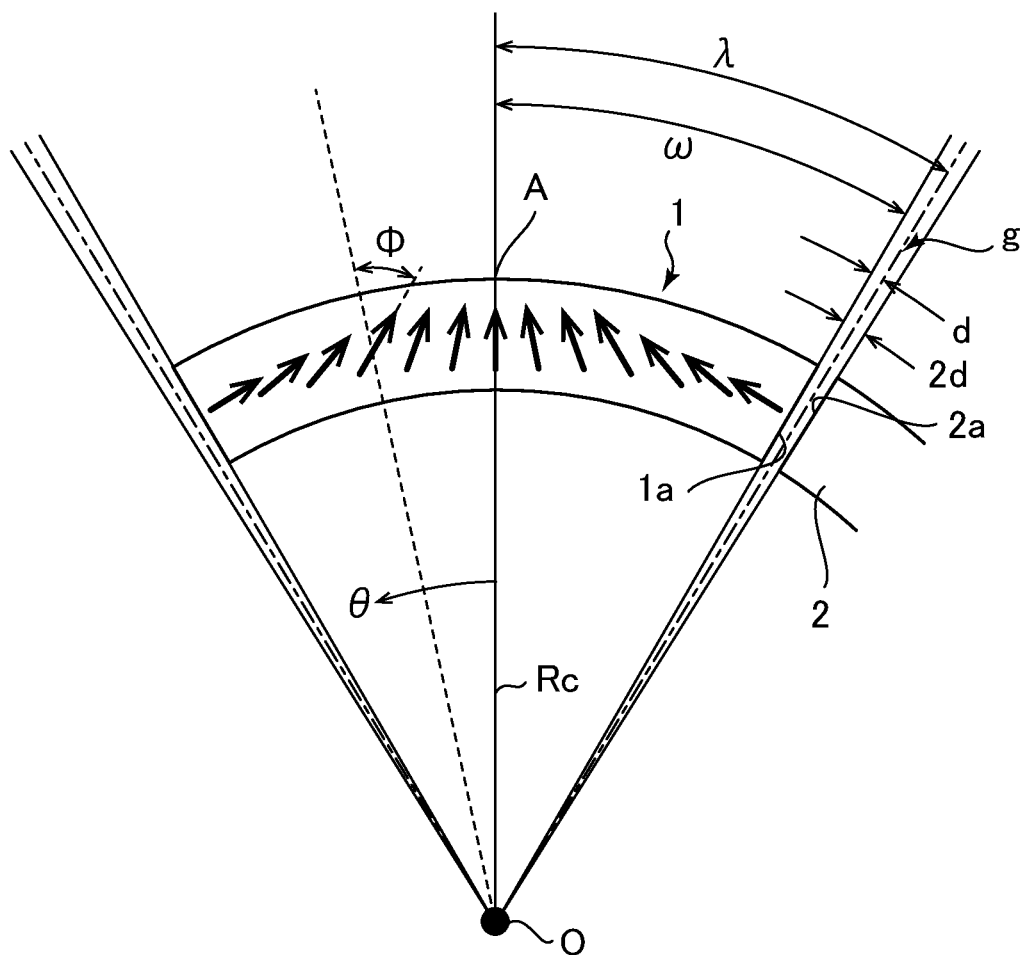
FIG. 1(a) is a cross-sectional view of a segment magnet constituting a polar-anisotropic ring magnet, to explain magnetization directions in the segment magnet.
Figure 1B:
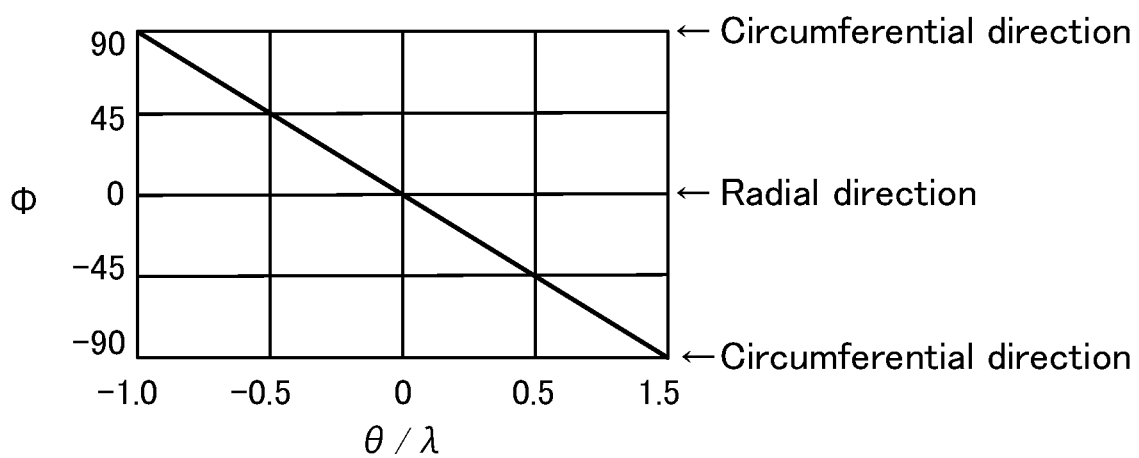
FIG. 1(b) is a chart presenting a relationship between a magnetization direction Φ and a cylindrical coordinate θ as measured from a circumferential center, in the segment magnet depicted in FIG. 1(a).

FIGS. 1(a) and 1(b) depict magnetization directions in a segment magnet constituting a 6-pole polar-anisotropic ring magnet. The segment magnet 1 is formed in an arc shape having a curvature center at a point O, and with a circumferential length set to fall within an angular range 2ω approximately corresponding to an angular range 2λ equivalent to one pole of the polar-anisotropic ring magnet, and a given thickness. With respect to the depicted segment magnet 1 equivalent to one pole, a segment magnet 2 equivalent to the next one pole is disposed in circumferentially-adjacent relation. The adjacent two segment magnets 1, 2 are arranged such that circumferentially adjacent end faces 1a, 1b thereof are opposed to each other, and a gap g having an angular interval 2d is formed between the opposed arranged end faces 1a, 1b.

Figure 2:
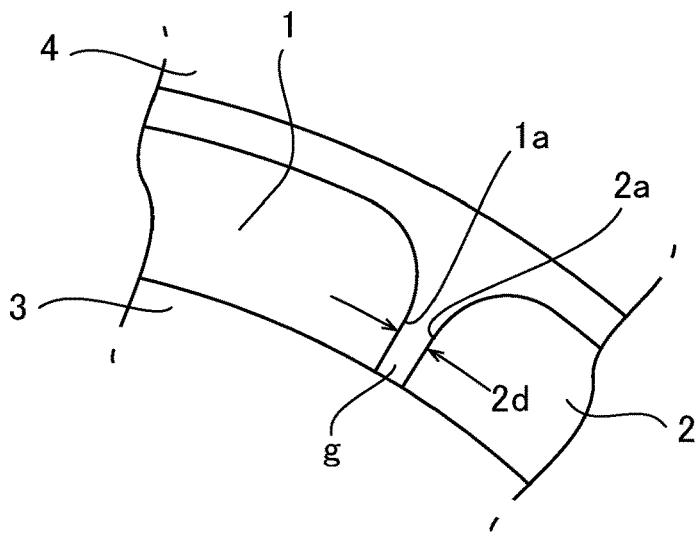
FIG. 2 is an enlarged sectional view depicting a gap formed between circumferentially-adjacent two segment magnets.

FIG. 2 depicts in an enlarged scale the gap g between the end faces 1a, 1b. In FIG. 2, the reference signs 3 and 4 denote, respectively, a rotor and a stator in a rotary electric machine such as an electric motor. The segment magnets 1, 2 are arranged side-by-side on an outer peripheral surface of the rotor 3. As above, in the arrangement of a plurality of segment magnets, the gap g with the angular range 2d is inevitably formed between adjacent ones of the segment magnets, so that the angular range 2λ corresponding to one pole in each of the segment magnets is a value calculated by adding ½ of the angular range 2d of the gap g at each of circumferentially-opposite ends of the segment magnet to the angular interval 2ω defining the circumferential length of the segment magnet. Then, assuming that a radial line connecting a circumferential center point A of an outer peripheral surface of the segment magnet 1 and the point O which is a curvature center of the arc of the segment magnet 1 is denoted by a central radial line Rc, and an angle between a magnetization direction of the segment magnet at each point located on a radial line Rc (θ) deviated from the central radial line Rc in a direction toward each of the ends of the segment magnet by an angle θ, and the radial line Rc (θ), is denoted by Φ, the magnetization direction of the segment magnet 1 forming the polar-anisotropic ring magnet is expressed by the following formula:

$$\Phi(\theta) = (\pi/2\lambda) \cdot \theta \quad (1)$$

In the formula (1), "π" denotes an angle equivalent to a half cycle in the case where a periodic magnetic flux distribution to be formed by the segment magnets equivalent to two poles is defined as one cycle. Thus, when the one cycle is represented by an angle of 360°, "π" denotes a half cycle of 180°. Therefore, the formula (1) can also be written as follows:

$$\Phi(\theta) = (90°/\lambda) \cdot \theta \quad (1)$$

Here, the angle Φ denoting the magnetization direction is set such that a clockwise direction and a counterclockwise direction with respect to the radial line Rc (θ) are, respectively, a positive direction and a negative direction, and the angle θ is an angle with respect to the central radial line Rc, and is set such that a counterclockwise direction with respect to the central radial line Rc is a positive direction. That the angle θ is 0 indicates that the magnetization direction is oriented in the radial direction. Further, that the angle θ is π/2 or 90° indicates that the magnetization direction is oriented in the circumferential direction. The relationship between the angles θ and Φ expressed by the formula (1) is presented in FIG. 1(b) by taking θ/λ and Φ, respectively, on the horizontal axis and the vertical axis. As can be seen from the formula (1) and FIG. 1(b), the angle Φ and the angle θ have a linear relationship. These magnetization directions will be referred to as "polar-anisotropic orientation".

Figure 3A:
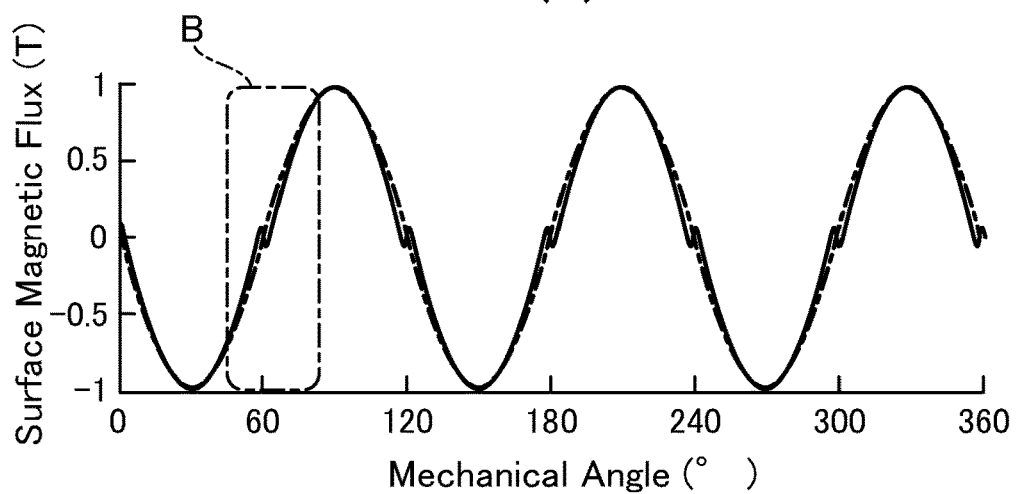
FIG. 3(a) is a chart presenting an approximate sinusoidal wave-shaped magnetic flux distribution to be obtained in a polar-anisotropic ring magnet in which a plurality of arc-shaped segment magnets are arranged in a circumferential direction of the ring magnet.

In FIG. 1(a), as for the segment magnet 2 circumferentially adjacent to the segment magnet 1, although the magnetization direction Φ thereof at each circumferential position θ is also set based on the formula (1), a magnetic flux vector thereof has a polarity reverse to that of a magnetic flux vector of the segment magnet 1. As a result, in the polar-anisotropic ring magnet, one cycle of sinusoidal wave-shaped magnetic flux distribution as depicted in FIG. 3(a) is obtained. However, in the polar-anisotropic ring magnet formed by circumferentially arranging the plurality of arc-shaped segment magnets, a gap g is formed between the adjacent two segment magnets 1, 2, as mentioned above, so that, in the inter-pole region corresponding to the gap g, the magnetic flux distribution is largely deviated from a sinusoidal wave shape.

Figure 3B:
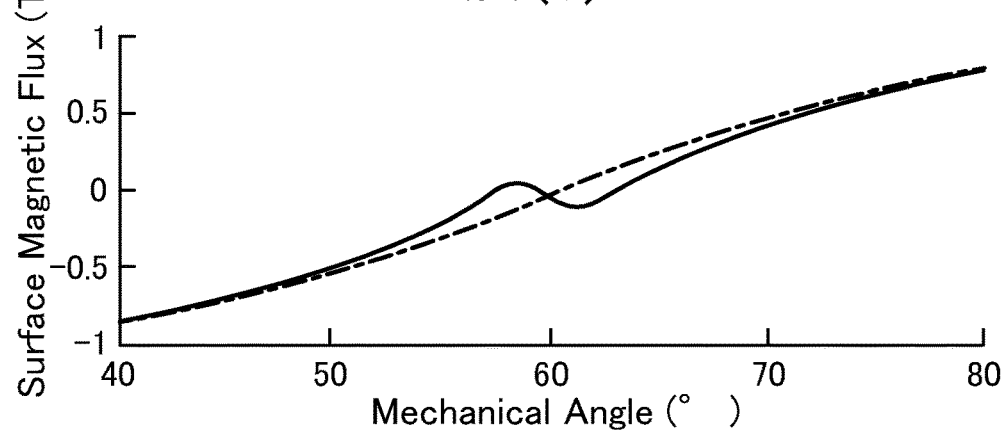
FIG. 3(b) is a chart presenting in an enlarged scale a magnetic flux distribution in a region in the vicinity of a gap formed in an inter-pole region between circumferentially-adjacent two segment magnets.

FIG. 3(b) is a chart presenting a magnetic flux distribution in the inter-pole region designated by the reference sign B in FIG. 3(a), wherein the magnetic flux distribution is derived by calculation in regard to a modeled gap shape in which a corner of an end face at each of the circumferentially-opposite ends of the segment magnet has a quarter-circular shaped cross-section. In FIG. 3(b), the scale of the horizontal axis is enlargedly indicated. As can be seen from FIG. 3(b), in the polar-anisotropic ring magnet formed by circumferentially arranging the plurality of arc-shaped segment magnets, a gap g is inevitably formed in the inter-pole region, so that the magnetic flux distribution is largely deviated from a sinusoidal wave shape.

In the present invention, the magnetization direction in the inter-pole region is corrected to thereby significantly reduce or solve the deviation of the magnetic flux distribution. With reference to the drawings, some preferred embodiments of the present invention will now be described in detail.

[First Embodiment]

Figure 4:
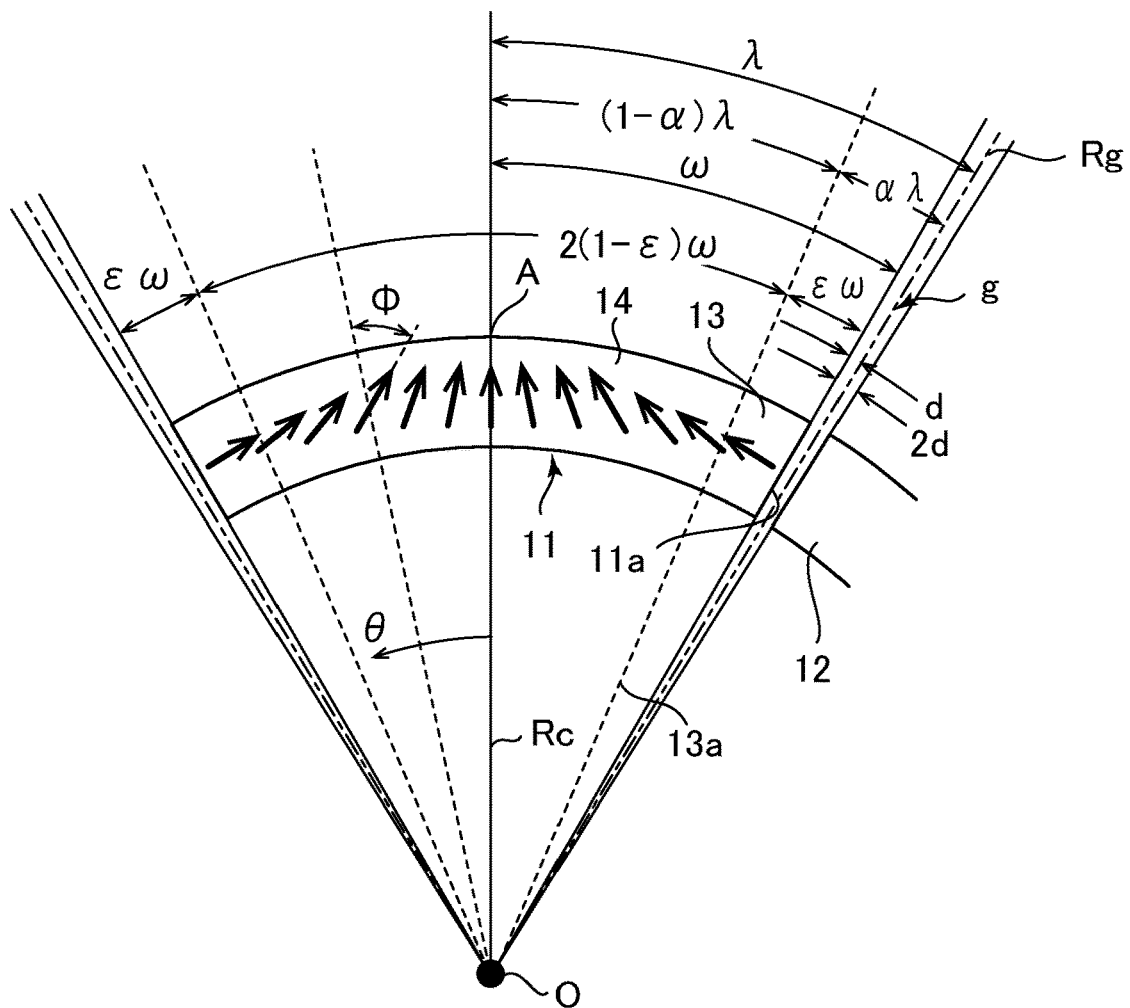
FIG. 4 is a cross-sectional view similar to that in FIG. 1(a), depicting a segment magnet for forming a polar-anisotropic ring magnet according to one embodiment of the present invention, to explain magnetization directions in the segment magnet.

FIG. 4 depicts a segment magnet 11 for forming a 6-pole polar-anisotropic ring magnet, according to a first embodiment of the present invention. The segment magnet 11 is formed in the same basic shape as that of the segment magnet 1 depicted in FIG. 1(a), i.e., an arc shape having a curvature center at a point O, and disposed over a circumferential length of an angular range 2λ equivalent to one pole of the 6-pole polar-anisotropic ring magnet. The segment magnet 11 is disposed such that a gap g equivalent to the aforementioned angle 2d is formed with respect to a circumferentially-adjacent segment magnet 12. Thus, as previously mentioned with reference to FIG. 1(a), the circumferential length of the segment magnet 11 becomes an angular interval 2ω which is less than the angular range 2λ equivalent to one pole, by the angular range 2d.

In this embodiment, in the segment magnet 11, a region extending circumferentially inwardly from each of two end faces 11a of circumferentially-opposite ends over an angular range εω is defined as an end region 13, and the remaining region other than the two end regions 13 is defined as a central region 14. In the central region 14, as with the segment magnet 1 depicted in FIG. 1(a), the magnetization directions are the "polar-anisotropic orientation" represented by the formula (1). However, in this embodiment, in order to correct the magnetization direction in the inter-pole region, the magnetization direction in the end region 13 is set based on the following formula:

$$\Phi(\theta)=(\pi/2\lambda)\cdot\theta-m[(\theta/\lambda)-1+\alpha]^n \quad (2)$$

or $$\Phi(\theta)=(90°/\lambda)\cdot\theta-m[(\theta/\lambda)-1+\alpha]^n \quad (2)$$

In the formula (2), the second term on the right-hand side is a correction term. Here, "α" is a coefficient "α" in the case where an angular range between a radial line 13a defining the end region 13 and a bisecting radial line Rg of the gap g is expressed as "αλ". In FIG. 4, [(90°−d)/90°]λ=ω, and 1−α=[(90°−d)/90°](1−ε). Thus, the formula (2) is expressed as follows:

$$\Phi(\theta)=[(90°-d)/\omega]\theta-m[(90°-d)/90°]^n\cdot[(\theta/\omega)-1+\varepsilon]^n \quad (3)$$

Here, because d is an extremely small value as compared to 90°, [(90°−d)/90°]$^n$ in the second term on the right-hand side in the formula (3) may be handled such that it is approximately equal to "1". In this case, the formula (2) is expressed as follows:

$$\Phi(\theta)=[(90°-d)/\omega]\theta-m[(\theta/\omega)-1+\varepsilon]^n \quad (4)$$

In this embodiment, assume that, in the formula (4), m is (π/2)−d, i.e., 90°−d, and n is 1. As a result, the magnetization direction Φ(θ) in the end region 13 is expressed as the following formula:

$$\Phi(\theta)=(1-\varepsilon)(90°-d) \quad (5)$$

Figure 5:
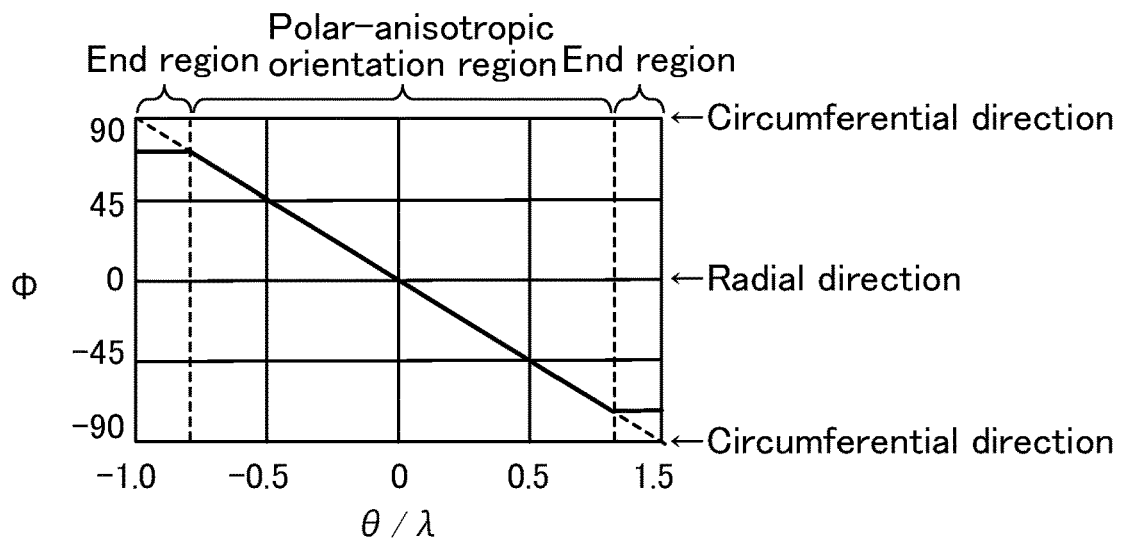
FIG. 5 is a chart presenting a relationship between the magnetization direction Φ and the cylindrical coordinate θ as measured from the circumferential center, in the segment magnet according to the embodiment depicted in FIG. 4.

The relationship between the angles θ and Φ of the segment magnet 11 according to this embodiment in which the magnetization direction in each of the end regions 13 is set based on the formula (5) can be indicated by taking θ/λ and Φ, respectively, on the horizontal axis and the vertical axis, as depicted in FIG. 5. As can be seen from FIG. 5, in the segment magnet 11 according to this embodiment, a magnetization direction angle in each of the end regions 13 is constant irrespective of the angle θ.

This segment magnet 11 is produced by sintering magnet material particles (particles of a magnet material) containing a rare-earth substance. In the course of the production, an external magnetic field is applied to a shaped body of the magnet material particles formed into a shape of the segment magnet to cause easy-to-magnetize axes of the magnet material particles to be oriented in directions corresponding to magnetization directions in the segment magnet, and the resulting magnetized body is subjected to sintering. In this way, a rare-earth permanent magnet-forming sintered body as one embodiment of the present invention is obtained in which the magnetization axes of the magnet material particles are oriented in given directions. Further, an external magnetic field is applied to the rare-earth permanent magnet-forming sintered body to obtain a rare-earth permanent magnet having the above magnetization directions. A plurality of the arc-shaped rare-earth permanent magnets each formed in this manner are arranged in a ring shape on a rotor of a rotary electric machine.

[Second Embodiment]

Except that, in the formula (4), m is set to $(\pi/2)-d+(\Delta/\varepsilon)$, and n is set to 1, the second embodiment is exactly the same as the first embodiment. Here, $\Delta$ is an arbitrarily set constant. In this case, the magnetization direction $\Phi(\theta)$ in each of the end region 13 is expressed by the following formula:

$$\Phi(\theta)=(1-\varepsilon)(90°-d)-[\theta-(1-\varepsilon)\omega](\Delta/(\varepsilon\omega)) \quad (6)$$

Figure 6:
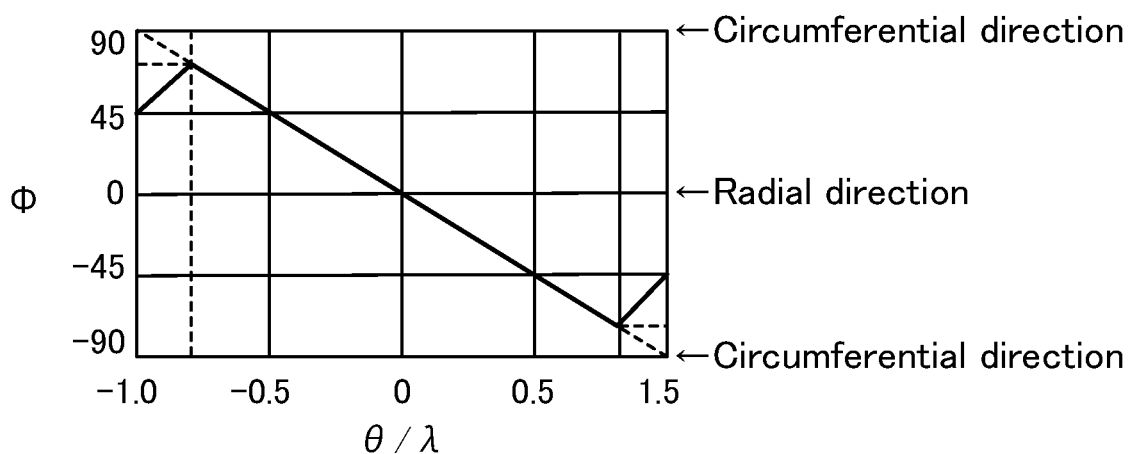
FIG. 6 is a chart presenting a relationship between the magnetization direction Φ and the cylindrical coordinate θ as measured from the circumferential center, in a segment magnet according to another embodiment of the present invention.

The relationship between the angles $\theta$ and $\Phi$ of the segment magnet 11 according to the second embodiment in which the magnetization direction in each of the end regions 13 is set based on the formula (6) can be indicated by taking $\theta/\lambda$ and $\Phi$, respectively, on the horizontal axis and the vertical axis, as depicted in FIG. 6. As can be seen from FIG. 6, in the segment magnet 11 according to the second embodiment, the magnetization direction angle in each of the end regions 13 linearly decreases in inverse proportion to an increase in the absolute value of the angle $\theta$.

In the formula (6), $\Delta$ denotes a constant falling within the following range: $0<\Delta\leq(1-\varepsilon)\cdot(90°-d)$. For example, it may be set in the range of 10° to 70°.

[Third Embodiment]

Except that, in the formula (4), each of m and n is a constant arbitrarily set in the range of greater than 1, the third embodiment is exactly the same as the first and second embodiments. In this case, the magnetization direction $\Phi(\theta)$ in each of the end region 13 is expressed by the following formula:

$$\Phi(\theta)=(90°-d)\theta/\omega-m[(\theta/\omega)-(1-\varepsilon)]^n \quad (7)$$

Figure 7:
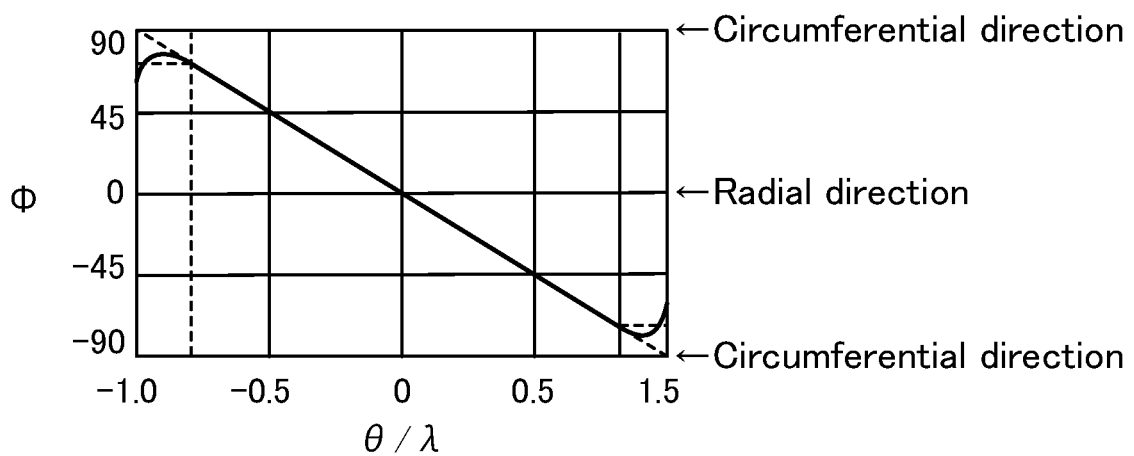
FIG. 7 is a chart presenting a relationship between the magnetization direction Φ and the cylindrical coordinate θ as measured from the circumferential center, in a segment magnet according to yet another embodiment of the present invention.

The relationship between the angles $\theta$ and $\Phi$ of the segment magnet 11 according to the third embodiment in which the magnetization direction in each of the end regions 13 is set based on the formula (7) can be indicated by taking $\theta/\lambda$ and $\Phi$, respectively, on the horizontal axis and the vertical axis, as depicted in FIG. 7. As can be seen from FIG. 7, in the segment magnet 11 according to the third embodiment, the magnetization direction angle in each of the end regions 13 changes depending on the angle $\theta$ based on a power law.

Even in a region where $\Phi$ changes based on the formula (7) under the power law, there is an area having almost no deviation from the polar-anisotropic orientation. Such an area can be substantially regarded as the polar-anisotropic orientation, and thus can be included in the central region. In this case, in order to distinguish from $\varepsilon$ defining the end region 13 having an orientation deviated from the polar-anisotropic orientation, the formula (7) is expressed as the following formula:

$$\Phi(\theta)=(90°-d)\theta/\omega-m[(\theta/\omega)-(1-\eta)]^n \quad (8)$$

In this formula, $\pi$ denotes a constant falling within the following range: $0.2\leq\eta\leq0.9$. Further, n is not particularly limited as long as it is a value greater than 1. For example, it may be set in the range of 2 to 10. Further, m is not particularly limited as long as it is a value greater than 1. For example, it may be set in the range of 100 to 5000.

EXAMPLES

Using a rotary electric machine in which a plurality of segment magnets based on each of the embodiments 1, 2 and 3 are arranged on an outer peripheral surface of a rotor, Examples 1 to 3 were prepared by changing a gap g between adjacent ones of the segment magnets among them, and Examples 4 to 7 were prepared by changing a pole number. Then, with respect to each of the Examples, a surface magnetic flux distortion rate in the vicinity of a gap region between the segment magnets was derived by calculation. A result of the calculation is presented in Table 1. As can be seen from Table 1, although the second embodiment exhibits a distortion rate-reducing effect higher than that of the first embodiment, and the third embodiment exhibits a distortion rate-reducing effect higher than that of the second embodiment, all of the first to third embodiments can achieve an excellent distortion rate-reducing effect, as compared to the conventional rotary electric machine. From the viewpoint of the result in Table 1, in the present invention, the angle value 2d of the gap g between the adjacent segment magnets needs to be 5 or less, preferably, 3 or less.

TABLE 1

Surface Magnetic Flux Distortion Rate

| Example | Pole Number | Inter-magnet Gap g [mm] | Conventional Machine | First Embodiment | Second Embodiment Improved Embodiment (1) | Third Embodiment Improved Embodiment (2) | Theoretical Difference d in Orientation Angle due to Gap g [°] |
|---|---|---|---|---|---|---|---|
| 1 | 6 | 1 | 8.68% | 2.90% | 1.45% | 1.05% | 1.4° |
| 2 | 6 | 2 | 13.40% | 5.65% | 2.47% | 1.42% | 2.9° |
| 3 | 6 | 3 | 16.91% | 7.24% | 2.39% | 1.92% | 4.3° |
| 4 | 8 | 1 | 9.95% | 2.69% | 1.81% | 1.09% | 1.9° |
| 5 | 10 | 1 | 10.99% | 2.81% | 1.97% | 1.38% | 2.4° |
| 6 | 12 | 1 | 11.84% | 2.99% | 2.10% | 1.60% | 2.9° |
| 7 | 14 | 1 | 12.46% | 2.28% | 2.26% | 1.65% | 3.3° |

[Production of Rare-Earth Permanent Magnet-Forming Sintered Body]

Figure 8:
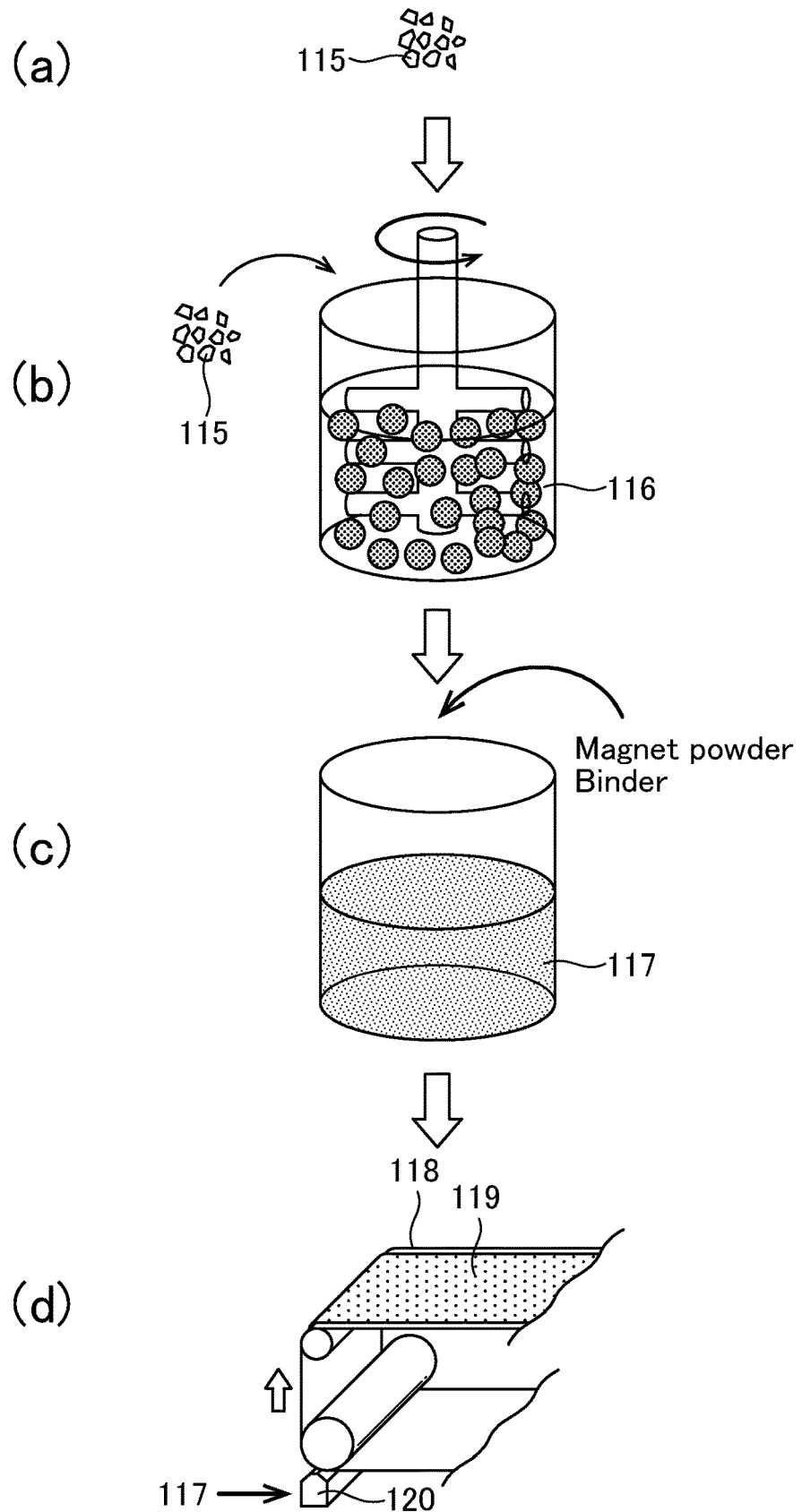

An example of a method of producing a rare-earth permanent magnet-forming sintered body according to the present invention will be described below. First of all, with reference to FIG. 8, a production method for the rare-earth permanent magnet-forming sintered body 1 according to the first embodiment depicted in FIGS. 4 and 5 will be described. FIG. 8 is a schematic diagram depicting a production process of the permanent magnet-forming sintered body 1 according to the first embodiment.

First of all, an ingot of a magnet material comprised of an Nd—Fe—B based alloy having a given mixing ratio is produced by a casting process. Typically, the Nd—Fe—B based alloy usable for a neodymium magnet has a composition comprising 30 wt % of Nd, 67 wt % of Fe which is preferably electrolytic iron, and 1.0 wt % of B. Subsequently, this ingot is coarsely pulverized to a size of about 200 µm, using heretofore-known means such as a stamp mill or a crusher. Alternatively, the ingot may be melted and subjected to a strip casting process to produce flakes, and then the flakes may be coarsely powdered by a hydrogen cracking process. In this way, coarsely-pulverized magnet material particles 115 are obtained (see FIG. 8(a)).

Subsequently, the coarsely-pulverized magnet material particles 115 are finely pulverized by a wet process using a bead mill 116, a dry process using a jet mill, or the like. For example, in the fine pulverization based on a wet process using a bead mill 116, the coarsely-pulverized magnet material particles 115 are finely pulverized, in the solvent, to a particle size falling within a given range (e.g., 0.1 µm to 5.0 µm), to thereby disperse the resulting magnet material particles in the solvent (see FIG. 8(b)). Subsequently, the magnet material particles contained in the solvent after the wet pulverization are dried by drying mean such as vacuum drying, and the dried magnet material particles are extracted (not depicted). A type of solvent usable in the pulverization is not particularly limited. For example, it is possible to use an organic solvent including: alcohols such as isopropyl alcohol, ethanol and methanol; esters such as ethyl acetate; lower hydrocarbons such as pentane and hexane; aromatics such as benzene, toluene and xylene; and ketones; and mixtures thereof, and an inorganic solvent including liquefied argon. In any case, it is preferable to use a solvent containing no oxygen atom therein.

On the other hand, in the fine pulverization based on a dry process using a jet mill, the coarsely-pulverized magnet material particles 115 are finely pulverized by the jet mill, in (a) an atmosphere consisting inert gas such as nitrogen gas, Ar gas or He gas, wherein an oxygen content of the inert gas is substantially 0%, or (b) an atmosphere consisting inert gas such as nitrogen gas, Ar gas or He gas, wherein an oxygen content of the inert gas is in the range of 0.0001 to 0.5%, and formed as fine particles having an average particle size falling within a given range, such as 0.7 µm to 5.0 µm. As used herein, the term "the concentration of oxygen is substantially 0%" does not limitedly mean that the concentration of oxygen is absolutely 0%, but means that oxygen may be contained in an amount to an extent that it very slightly forms an oxide layer on surfaces of the fine particles.

Subsequently, the magnet material particles finely pulverized by the bead mill 116 or the like are formed into a desired shape. For shaping of the magnet material particles, a mixture obtained by mixing the finely-pulverized magnet material particles 115 and a binder together, i.e., a compound 117, is preliminarily prepared. As the binder, it is preferable to use a resin material. In the case where a resin is used as the binder, it is preferable to use a polymer containing no oxygen atom in its structure and having a depolymerization property. Further, it is preferable to use a thermoplastic resin so as to enable a residue of the mixture 117 of the magnet material particles and the binder, occurring when the mixture is formed into a desired shape such as a trapezoidal shape in cross-section, as described later, to be reused, and enable magnetic field orientation to be performed under a condition that the binder is softened as a result of heating the mixture. More specifically, a polymer is suitably used which comprises one or more polymers or copolymers formed from a monomer represented by the following general formula (1):

(where each of R1 and R2 denotes one of a hydrogen atom, a lower alkyl group, a phenyl group and a vinyl group.)

Examples of a polymer meeting the above conditions include: polyisobutylene (PIB) as a polymer of isobutylene; polyisoprene (isoprene rubber (IR)) as a polymer of isoprene; polybutadiene (butadiene rubber (BR)) as a polymer of 1,3-butadiene; polystyrene as a polymer of styrene; a styrene-isoprene-styrene block copolymer (SIS) as a copolymer of styrene and isoprene; butyl rubber (IIR) as a copolymer of isobutylene and isoprene; a styrene-butadiene-styrene block copolymer (SBS) as a copolymer of styrene and butadiene; a styrene-ethylene-butadiene-styrene copolymer (SEBS) as a copolymer of styrene, ethylene and butadiene; a styrene-ethylene-propylene-styrene copolymer (SEPS) as a copolymer of styrene, ethylene and propylene; an ethylene-propylene copolymer (EPM) as a copolymer of ethylene and propylene; EPDM obtained by copolymerizing diene monomers together with ethylene and propylene; polyethylene as a polymer of ethylene; polypropylene as a polymer of propylene; a 2-methyl-1-pentene polymerized resin as a polymer of 2-methyl-1-pentene; a 2-methyl-1-butene polymerized resin as a polymer of 2-methyl-1-butene; and an α-methylstyrene polymerized resin as a polymer of α-methylstyrene. A resin to be used as the binder may have a composition containing a polymer or copolymer of monomers containing an oxygen atom and/or a nitrogen atom (e.g., poly(butyl methacrylate) or poly(methyl methacrylate)) in a small amount. Further, a monomer which does not meet the general formula (1) may be partially copolymerized. Even in such a situation, it is possible to achieve the object of the present invention.

As a resin to be used as the binder, it is desirable, from a viewpoint of adequately performing magnetic field orientation, to use a thermoplastic resin capable of being softened at a temperature of 250° C. or less, more specifically a thermoplastic resin having a glass-transition temperature or flow starting temperature of 250° C. or less.

In order to disperse the magnet material particles over the thermoplastic resin, it is desirable to add a dispersant in an appropriate amount. As the dispersant, it is desirable to add at least one selected from the group consisting of alcohol, carboxylic acid, ketone, ether, ester, amine, imine, imide, amide, cyanogen, phosphorous functional group, sulfonic acid, a compound having an unsaturated bond such as a double bond or a triple bond, and a liquid, saturated hydrocarbon compound. Two or more of them may be used in the form of a mixture. Further, in advance of aftermentioned treatment for applying a magnetic field to the mixture of the magnet material particles and the binder to thereby magnetically orient the magnet material particles, the mixture is heated to allow such magnetic field orientation treatment to be performed under a condition that the binder component is softened.

By using a binder satisfying the above conditions to serve as the binder to be mixed with the magnet material particles, it is possible to reduce an amount of carbon and an amount of oxygen remaining in a rare-earth permanent magnet-forming sintered body after sintering. Specifically, an amount of carbon remaining in a rare-earth permanent magnet-forming sintered body after sintering can be reduced to 2000 ppm or less, more preferably 1000 ppm or less. Further, an amount of oxygen remaining in a rare-earth permanent magnet-forming sintered body after sintering can be reduced to 5000 ppm or less, more preferably 2000 ppm or less.

An addition amount of the binder is set to a value capable of, when shaping a slurry-form or heated and melted mixture or compound 117, adequately filling gaps among the magnet material particles so as to provide improved thickness accuracy to a shaped body obtained as a result of the shaping. For example, a ratio of the binder to a total amount of the magnet material particles and the binder is set in the range of 1 wt % to 40 wt %, more preferably in the range of 2 wt % to 30 wt %, still more preferably in the range of 3 wt % to 20 wt %.

In the following examples, the mixture is formed into a shape other than that of an intended product once, and a magnetic field is applied to the resulting shaped body to orient easy-to-magnetize axes of the magnet material particles, whereafter the resulting shaped body is subjected to a sintering treatment to obtain a product having a desired shape such as an arc shape in cross-section as depicted in FIG. 1. Particularly, in the following examples, the mixture or compound 117 comprising the magnet material particles and the binder is formed into a sheet-like green (unprocessed or untreated) shaped body (hereinafter referred to as "green sheet") once, and then further formed into a shape for the orientation treatment. For forming the mixture, particularly, into a sheet shape, it is possible to employ a forming method using, for example, a hot-melt coating process which comprises heating the compound 117, i.e., the mixture of the magnet material particles and the binder, and then coating the resulting melt onto a substrate to thereby form the melt into a sheet shape, or a slurry coating process which comprises coating a slurry containing the magnet material particles, the binder and an organic solvent, on a substrate, to thereby form the slurry into a sheet shape.

Although the following description will be made about shaping of the green sheet using, particularly, the hot-melt coating process, the shaping method in the present invention is not limited to such a specific coating process. For example, the shaping may be performed by putting the compound 117 in a shaping mold, and applying a pressure of 0.1 to 100 MPa thereto while heating it from room temperature to 300° C. More specifically, this shaping method may comprise heating the compound 117 to a softening temperature thereof, and injecting and charging the softened compound 117 into a mold while applying an injection pressure thereto.

As mentioned above, a binder is mixed with the magnet material particles finely pulverized using the bead mill 116 or the like, to prepare a clayey mixture or compound 117 comprised of the magnet material particles and the binder. In this process, it is possible to use, as the binder, a mixture of a resin and a dispersant, as mentioned above. For example, it is preferable to use, as the resin, a thermoplastic resin comprising a polymer containing no oxygen atom in its structure and having a depolymerization property. Further, it is preferable to add, as the dispersant, at least one selected from the group consisting of alcohol, carboxylic acid, ketone, ether, ester, amine, imine, imide, amide, cyanogen, phosphorous functional group, sulfonic acid, and a compound having an unsaturated bond such as a double bond or a triple bond. As to an addition amount of the binder, in the compound 117 after addition of the binder, a ratio of the binder to a total amount of the magnet material particles and the binder is set in the range of 1 wt % to 40 wt %, more preferably in the range of 2 wt % to 30 wt %, still more preferably in the range of 3 wt % to 20 wt %, as mentioned above.

Further, an addition amount of the dispersant is preferably determined depending on a particle size of the magnet material particles, wherein it is recommended to increase the addition amount as the particle size of the magnet material particles becomes smaller. Specifically, the addition amount may be set in the range of 0.1 parts to 10 parts, preferably in the range of 0.3 parts to 8 parts, with respect to 100 parts of the magnet material particles. If the addition amount is excessively small, a dispersion effect becomes poor, possibly leading to deterioration in orientation property. On the other hand, if the addition amount is excessively large, the dispersant is likely to contaminate the magnet material particles. The dispersant added to the magnet material particles adheres onto surfaces of the magnet material particles, and acts to facilitate dispersion of the magnet material particles to provide the clayey mixture, and to assist turning of the magnet material particles in the later mentioned magnetic field orientation treatment. As a result, it becomes possible to facilitate orientation during application of a magnetic field so as to uniform respective directions of easy-to-magnetize axes of the magnet material particles, into approximately the same direction, i.e., so as to increase the degree of orientation. Particularly, in the case where the binder is mixed with the magnet material particles, the binder is present around the surfaces of the magnet material particles, so that a frictional force against the magnet material particles during the magnetic field orientation treatment is increased, thereby possibly leading to deterioration in orientation property of the magnet material particles. Thus, the effect arising from addition of the dispersant becomes more important.

Preferably, the mixing of the magnet material particles and the binder is performed in an atmosphere consisting of inert gas such as nitrogen gas, Ar gas or He gas. As one example, the mixing of the magnet material particles and the binder is performed by inputting the magnet material particles and the binder into a stirring machine and stirring them using the stirring machine. In this case, with a view to enhancing kneading performance, heating-stirring (stirring under heating) may be performed. It is also desirable to perform the mixing of the magnet material particles and the binder, in an atmosphere consisting of inert gas such as nitrogen gas, Ar gas or He gas. Particularly, in the case where the coarsely-pulverized magnet material particles are finely pulverized by a wet process, the compound 117 may be obtained by adding the binder to a solvent used for pulverization, without extracting the magnet material particles from the solvent, and, after kneading the resulting mixture, volatilizing the solvent.

Subsequently, the compound 117 is formed into a sheet shape to prepare the aforementioned green sheet. Specifically, in case of employing the hot-melt coating process, the compound 117 is heated and melted to have flowability, and then coated on a support substrate 118. Subsequently, the compound 117 is solidified according to heat dissipation to form a long strip-shaped green sheet 119 on the support substrate 118. In this case, although a temperature during heating and melting of the compound 117 varies depending on a type and an amount of a binder used, it is typically set in the range of 50 to 300° C. In this case, it is to be understood that the temperature needs to be set to a value greater than the flow starting temperature of the binder used. On the other hand, in case of employing the slurry coating process, a slurry obtained by dispersing the magnet material particles, the binder and optionally an additive for facilitating the orientation, over a large volume of solvent is coated on the support substrate 118. Subsequently, the slurry is subjected to drying to volatilize the solvent therefrom to thereby form a long strip-shaped green sheet 119 on the support substrate 118.

As a coating system for the melted compound 117, it is preferable to use a system having excellent layer thickness controllability, such as a slot-die system or a calender roll system. Particularly, in order to realize high thickness accuracy, it is desirable to use a die system or a comma coating system which is a system having particularly excellent layer thickness controllability, i.e., a system capable of coating a layer having a highly-accurate thickness, on a surface of a substrate. For example, in the slot-die system, the compound 117 after being heated to have flowability is pressure-fed from a gear pump into a die, and discharged from the die to perform coating. On the other hand, in the calender roll system, the compound 117 is fed into a nip gap between two heated rolls, in a controlled amount, and the rolls are rotated to coat the compound 117 melted by heat of the rolls, onto the support substrate 118. As one example of the support substrate 118, it is preferable to use a silicone-treated polyester film. Further, it is preferable to use a defoaming agent or perform a vacuum heating defoaming process to sufficiently defoam a layer of the coated and developed compound 117 so as to prevent gas bubbles from remaining in the layer. Alternatively, the melted compound 117 may be extruded onto the support substrate 118 while being formed into a sheet shape, by an extrusion forming or injection forming, instead of being coated on the support substrate 118, to thereby form the green sheet 119 on the support substrate 118.

In the example depicted in FIG. 8, coating of the compound 117 is performed using a slot-die 120. In a step of forming the green sheet 119 using this slot-die system, it is desirable to actually measure a sheet thickness of the coated green sheet 119, and adjust a nip gap between the slot-die 120 and the support substrate 118, by feedback control based on the actually-measured value. In this case, it is desirable to reduce a variation in amount of the flowable compound 117 to be fed to the slot-die 120, as small as possible, e.g., to ±0.1% or less, and further reduce a variation in coating speed as small as possible, e.g., to ±0.1% or less. This control makes it possible to improve the thickness accuracy of the green sheet 119. As one example, with respect to a design value of 1 mm, the thickness accuracy of the green sheet 119 may be within ±10%, preferably within ±3%, more preferably within ±1%. In the calender roll system, a film thickness of the compound 117 to be transferred to the support substrate 118 can be controlled by feedback-controlling calendering conditions based on an actually-measured value in the same manner as that described above.

Preferably, the thickness of the green sheet 119 is set in the range of 0.05 mm to 20 mm. If the thickness is reduced to less than 0.05 mm, it becomes necessary to laminate a plurality of layers so as to achieve a required magnet thickness, resulting in deteriorated productivity.

[Production of Sintered Body According to First Embodiment]

Subsequently, the green sheet 119 formed on the support substrate 118 by the hot-melt coating process is cut into a size corresponding to a desired magnet size to form a processing sheet piece 123. In the first embodiment, as depicted in FIG. 9(*a*), the processing sheet piece 123 is formed in a cross-sectional shape having: an arc-shaped region 123*a* corresponding to the central region in the rare-earth permanent magnet-forming sintered body 1 as a final product; and two linear-shaped regions 123*b*, 123*c* continuous, respectively, with opposite ends of the arc-shaped region 123*a*. The arc-shaped region 123*a* is formed in an arc shape having a curvature center at a point indicated by O in FIG. 9(*a*), and, in each of the linear-shaped regions 123*b*, 123*c* continuous, respectively, with the opposite ends of the arc-shaped region 123*a*, a part extending over an angular interval εω, i.e., ε×90°, about the curvature center O will be formed as an end region corresponding to the end region 13 of the segment magnet depicted in FIG. 2. This processing sheet piece 123 has a length dimension in a direction orthogonal to the surface of the drawing sheet, and dimensions of the cross-section and the length dimension are set in consideration of a dimensional shrinkage during an later mentioned sintering step, i.e., to enable the desired magnet size to be obtained after the later mentioned sintering step.

A parallel magnetic field 121 parallel to a direction connecting the curvature center O and a circumferential center point A of the arc-shaped region 123*a* is applied to the processing sheet piece 123 depicted in FIG. 9 (*a*). Through this magnetic field application, easy-to-magnetize axes of the magnet material particles included in the processing sheet piece 123 are oriented in the direction of the magnetic field, i.e., in a direction parallel to a thickness direction of the processing sheet piece 123, as indicated by the arrowed lines 122 in FIG. 9(*a*). Specifically, the processing sheet piece 123 is placed in a magnetic field application mold (not depicted) having a cavity with a shape corresponding to that of the processing sheet piece 123, and heated to soften the binder contained in the processing sheet piece 123. This enables the magnet material particles to be turned within the binder, i.e., enables the easy-to-magnetize axes of the magnet material particles to be oriented in directions along the parallel magnetic field 121.

In this process, although a temperature and a time for heating the processing sheet piece 123 vary depending on a type and an amount of a binder used, they may be set, respectively, to 40 to 250° C. and 0.1 to 60 minutes, for example. In either case, for softening the binder contained in the processing sheet piece 123, the heating temperature needs to be set to a value equal to or greater than a glass-transition temperature or flow starting temperature of the binder used. Examples of a means to heat the processing sheet piece 123 include a heating system using a hot plate, and a system using, as a heat source, a heating medium such as silicone oil. A magnetic field intensity during the magnetic field application may be set in the range of 5000 [Oe] to 150000 [Oe], preferably in the range of 10000 [Oe] to 120000 [Oe]. As a result, the easy-to-magnetize axes of the magnet material particles included in the processing sheet piece 123 are oriented in parallel alignment in directions along the parallel magnetic field 121, as depicted in FIG. 9(*a*). This magnetic field application step may be configured such that a magnetic field is simultaneously applied to a plurality of the processing sheet pieces 123. In this case, a mold having a plurality of cavities may be used, or a plurality of molds may be arranged side-by-side, so as to enable the parallel magnetic field 121 to be simultaneously applied to the plurality of processing sheet pieces 123. The step of applying a magnetic field to the processing sheet piece 123 may be performed in concurrence with the heating step, or during a period after completion of the heating step and before solidification of the binder of the processing sheet piece 123.

Figure 9A:
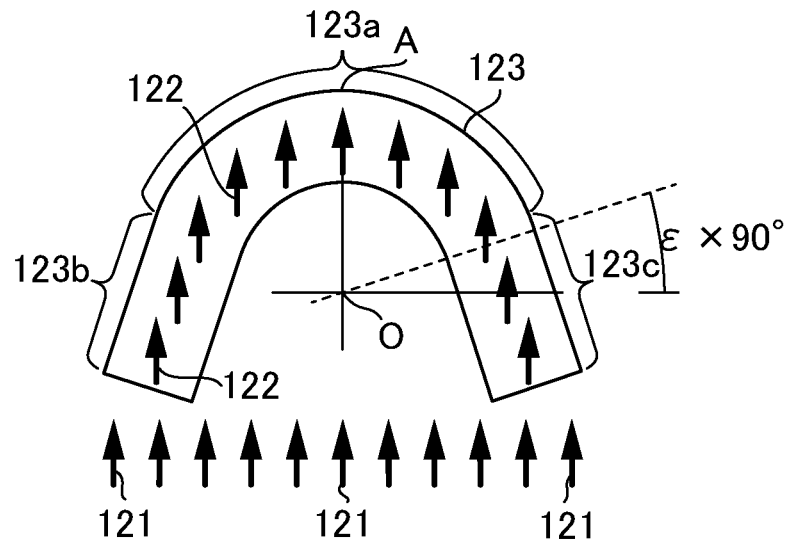
FIG. 9(a) is a sectional view of a processing sheet piece to explain orientation treatment for easy-to-magnetize axes of magnet material particles in a first embodiment of the present invention, and depicts a cross-sectional shape of the sheet piece during magnetic field application.
Figure 9B:
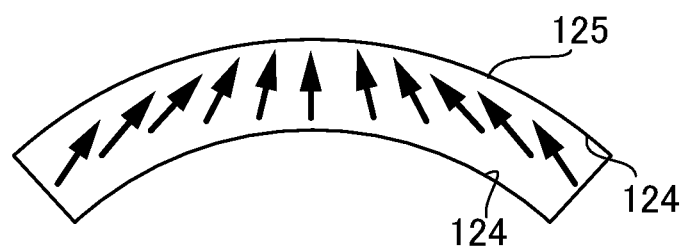
FIG. 9(b) is a sectional view of a processing sheet piece to explain orientation treatment for easy-to-magnetize axes of magnet material particles in a first embodiment of the present invention, and depicts a cross-sectional shape of a sintering sheet piece after being subjected to deformation treatment after the magnetic field application.
Figure 9C:
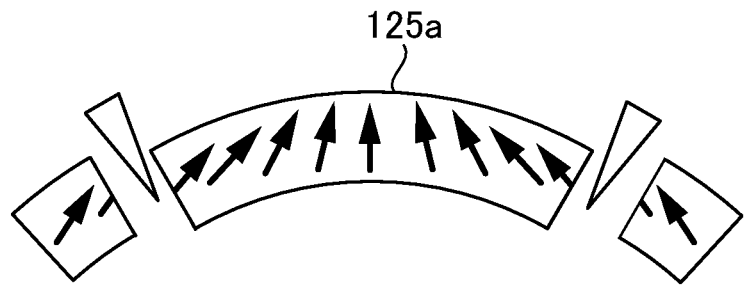
FIG. 9(c) is a sectional view of a processing sheet piece to explain orientation treatment for easy-to-magnetize axes of magnet material particles in a first embodiment of the present invention, and depicts an end cutting step after the shaping.

Subsequently, the processing sheet piece 123 in which the easy-to-magnetize axes of the magnet material particles thereof are oriented in parallel alignment as indicated by the arrowed lines 122 through the magnetic field application step depicted in FIG. 9(a) is extracted from the magnetic field application mold, and transferred into a final shaping mold having an arc-shaped cavity 124 depicted in FIG. 9(b), so as to be shaped into a sintering sheet piece 125. Through this shaping, the processing sheet piece 123 is deformed such that the arc-shaped region 123 as a central region thereof and the linear-shaped regions 123a, 123c as opposite ends thereof end up with a mutually-continuous arc shape having the same curvature radius, and as a result, the sintering sheet piece 125 is formed. In the sintering sheet piece 125 formed through the shaping step, easy-to-magnetize axes of magnet material particles located along the central center line O-A are oriented in a radial direction of the arc. Further, in two regions on both sides of the center line O-A, easy-to-magnetize axes have a polar-anisotropic orientation, due to the deformation, as depicted in FIG. 9(b).

The post-orientation sintering sheet piece 125 in which the easy-to-magnetize axes of the magnet material particles thereof are oriented in the above manner is processed such that each of opposite ends thereof is cut off while a part thereof corresponding to the aforementioned angular interval εω is left, and as a result, a sintering sheet piece 125a is formed. This sintering sheet piece 125a is subjected to calcining treatment in a non-oxidizing atmosphere adjusted at atmospheric pressure, or a pressure greater or less than atmospheric pressure (e.g., at 1.0 Pa or 1.0 MPa) at a decomposition temperature of the binder, for a holding time of several hours to several ten hours (e.g., 5 hours). In this treatment, it is recommended to use a hydrogen atmosphere or a mixed gas atmosphere of hydrogen and inert gas. In the case where the calcining treatment is performed in a hydrogen atmosphere, a supply amount of hydrogen during the calcining treatment is set, for example, to 5 L/min. The calcining treatment makes it possible to remove organic compounds contained in the binder by decomposing the organic compounds to monomers by a depolymerization reaction or other reactions, and releasing the monomers. That is, decarbonizing which is treatment for reducing an amount of carbon remaining in the sintering sheet piece 125a is performed. Further, it is preferable to perform the calcining treatment under conditions which enable the amount of carbon remaining in the sintering sheet piece 125a to become 2000 ppm or less, preferably 1000 ppm or less. This makes it possible to densely sinter the entire sintering sheet piece 125a through subsequent sintering treatment to thereby suppress lowering of residual magnetic flux density and coercivity. In the case where a pressurization condition during the calcining treatment is set to a pressure greater than atmospheric temperature, it is desirable to set the pressure to 15 MPa or less. Further, the pressurization condition may be set to a pressure greater than atmospheric temperature, more specifically, to 0.2 MPa or more. In this case, an effect of reducing an amount of residual carbon can be particularly expected.

The binder decomposition temperature may be set based on a result of analysis of binder decomposition products and decomposition residues. Specifically, it is recommended to select a temperature range in which, when binder decomposition products are collected, no decomposition product other than monomers is observed, and, in analysis of residues, no product resulting from a side reaction of a residual binder component is detected. Although the binder decomposition temperature varies depending on a type of a binder, it may be set in the range of 200° C. to 900° C., preferably in the range of 400° C. to 500° C., e.g., to 450° C.

Figure 11:
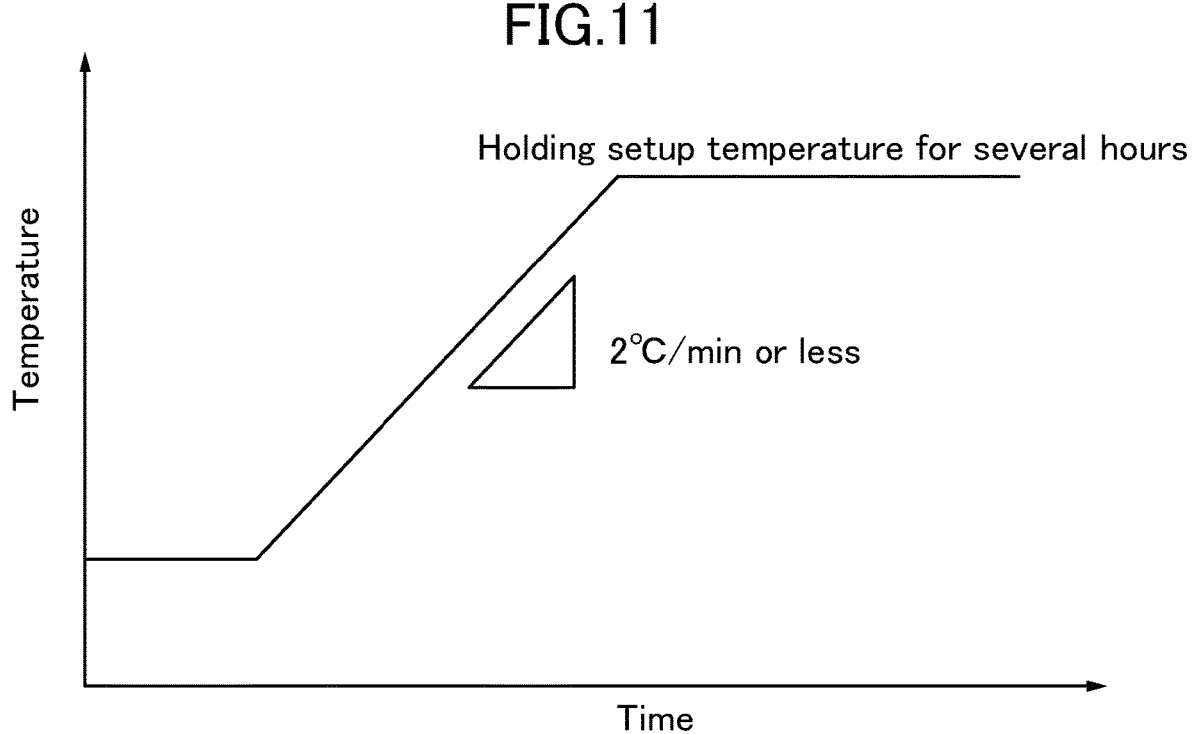
FIG. 11 is a graph presenting a desirable temperature rising speed in calcining treatment.

In the above calcining treatment, it is preferable to set a temperature rising speed to a smaller value, as compared to typical sintering treatment for a rare-earth permanent magnet. Specifically, the temperature rising speed may be set to 2° C./min or less, e.g., 1.5° C./min. In this case, a good result can be obtained. Thus, the calcining treatment is performed such that a calcining temperature is increased at a given temperature rising speed of 2° C./min or less as depicted in FIG. 11, and, after reaching a predetermined setup temperature (binder decomposition temperature), held at the setup temperature for several hours to several ten hours. As above, the temperature rising speed in the calcining treatment is set to a relatively small value, so that carbon in the sintering sheet piece 125a is removed in a step-by-step manner without being rapidly removed. This makes it possible to reduce an amount of residual carbon to a sufficient level to thereby increase the density of a permanent magnet-forming sintered body after sintering. That is, by reducing the amount of residual carbon, it is possible to reduce voids in a permanent magnet. When the temperature rising speed is set to 2° C./min or less as mentioned above, the density of a permanent magnet-forming sintered body after sintering can be increased to 98% or more (7.40 g/cm$^3$ or more), and high magnet properties can expected in a permanent magnet after magnetization.

Subsequently, treatment for sintering the sintering sheet piece 125a calcined by the calcining treatment is performed. In the first embodiment, as the sintering treatment, it is preferable to employ a uniaxial pressing-sintering method which comprises sintering the sintering sheet piece 125a while uniaxially pressing the sintering sheet piece 125a in the length direction, although an in-vacuum non-pressurized sintering method may be employed. In the uniaxial pressing-sintering method, the sintering sheet piece 125a is loaded in a sintering mold (not depicted) having a cavity with the same shape as that designated by the reference sign "124" in FIG. 9(b). Then, after closing the mold, the sintering sheet piece 125a is sintered while being pressed in the length direction. As this pressing-sintering technique, it is possible to employ any heretofore-known techniques such as hot press sintering, hot isostatic press (HIP) sintering, ultrahigh pressure synthesis sintering, gas pressure sintering, and spark plasma sintering (SPS). In particular, it is preferable to employ the SPS in which a pressure can be applied in a uniaxial direction, and sintering is performed by electric current sintering.

In the case where the sintering is performed by the SPS, it is preferable to perform the sintering, for example, at a pressing pressure of 0.01 MPa to 100 MPa, in a vacuum atmosphere at a pressure of several Pa or less, wherein a treatment temperature is increased up to 900° C. to 1100° C. at a temperature rising speed of 5° C./min to 30° C./min, and then held until shrinkage of the sintering sheet piece 125a in a pressing direction becomes substantially 0. Subsequently, after cooling the resulting sheet piece, a heat treatment is performed in which the sheet piece is heated to 300° C. to 1000° C. again, and held at this temperature for 2 hours. As a result of the above sintering treatment, the rare-earth permanent magnet-forming sintered body 1 according to the first embodiment is produced from the sintering sheet piece 125a. As above, the uniaxial pressing-sintering method capable of sintering the sintering sheet piece 125a while pressing it in the length direction makes it possible to suppress a situation where orientations of the easy-to-magnetize axes imparted to the magnet material particles in the sintering sheet piece 125a are changed.

A plurality of the above rare-earth permanent magnet-forming sintered bodies 1 are arranged side-by-side on the outer peripheral surface of the rotor core 3 depicted in FIG. 2, in an un-magnetized state. Then, each of the rare-earth permanent magnet-forming sintered bodies 1 arranged in this manner is subjected to magnetization along the easy-to-magnetize axes, i.e., C axes, of the magnet material particles included therein. Specifically, the magnetization is performed such that an N-pole and an S-pole are alternately arranged along a circumferential direction of the rotor core 3, with respect to the plurality of rare-earth permanent magnet-forming sintered bodies 1 each arranged on the outer peripheral surface of the rotor core 3. As a result, the permanent magnet 1 can be produced. For magnetization of the rare-earth permanent magnet-forming sintered body 1, it is possible to use any theretofore-known magnetization means, such as a magnetizing coil, a magnetizing yoke, or a capacitor-type magnetizing power supply device. Alternatively, the rare-earth permanent magnet-forming sintered body 1 may be magnetized to form a rare-earth permanent magnet, before being arranged on the outer peripheral surface of the rotor core 3, and then this magnetized magnet may be arranged on the outer peripheral surface of the rotor core 3. Subsequently, motor components such as the stator 4 and a rotary shaft are assembled to the resulting rotor to produce a desired electric motor such as an SPM (Surface Permanent Magnet) motor.

As described above in detail, in the production method for the rare-earth permanent magnet-forming sintered body 1 according to the first embodiment, a magnet material is pulverized into fine particles of the magnet material, and the pulverized magnet material particles and a binder are mixed together to create a compound 117. Then, the created compound 117 is formed into a sheet shape to prepare a green sheet 119. Subsequently, the shaped green sheet 119 is cut into a sheet piece having a given size and the sheet piece is formed into a desired shape to form a processing sheet piece 123. Then, a parallel magnetic field is applied to the processing sheet piece 123 in a thickness direction thereof to thereby orient easy-to-magnetize axes of the magnet material particles therein. Then, the processing sheet piece 123 after being subjected to the orientation treatment is deformed into a given product shape, to obtain a sintering sheet piece 125a. Subsequently, the sintering sheet piece 125a is sintered in a non-pressing state, or a uniaxially pressing state in a length direction thereof, to produce the rare-earth permanent magnet-forming sintered body 1.

In the aforementioned method pertaining to the first embodiment, by shaping the compound, i.e., a mixture obtained by mixing magnet material particles and a binder together, easy-to-magnetize axes can be oriented so as to be adequately converged toward the surface of each of the end regions requiring demagnetization measures. Thus, after magnetization, it becomes possible to adequately concentrate a magnetic flux to prevent variation in magnetic flux density while ensuring the demagnetization resistant property. Further, the mixture with a binder is subjected to shaping, so that, as compared to a method using a powder compact or the like, it becomes possible to improve a degree of orientation without turning of the magnet material particles after the orientation treatment. In the technique of performing orientation by applying a magnetic field to the mixture of the magnet material particles and a binder, the number of turns of a winding wire through which a current is passed to form the magnetic field can be appropriately increased, so that it is possible to ensure a magnetic field intensity in a wide range during the magnetic field orientation, and apply a magnetic field for a long period of time in a magnetostatic field. This makes it possible to realize a high degree of orientation with little variation. Further, after the orientation treatment, resulting orientation directions may be corrected. This makes it possible to ensure a highly oriented state with little variation The capability of realizing a high degree of orientation with little variation leads to a reduction in variation of shrinkage caused by sintering. This makes it possible to ensure uniformity of product shape after sintering. As a result, it can be expected to enable the burden of outer shape processing after sintering to be reduced, thereby largely improving stability in mass production. Further, in the step of performing magnetic field orientation, a magnetic field is applied to the mixture of the magnet material particles and a binder, and the mixture after the magnetic field application is deformed into a shaped body to thereby manipulate directions of easy-to-magnetize axes. Thus, it becomes possible to correct orientation directions by deforming the mixture which has been subjected to magnetic field orientation once, to thereby adequately orient easy-to-magnetize axes in the end regions. As a result, it becomes possible to reduce a deviation of a magnetic flux distribution in the end regions. Thus, in a rotary electric machine provided with a plurality of permanent magnets each formed by magnetizing the sintered body 1, it becomes possible to suppress cogging torque.

[Production of Sintered Body According to Second Embodiment]

Figure 10A:
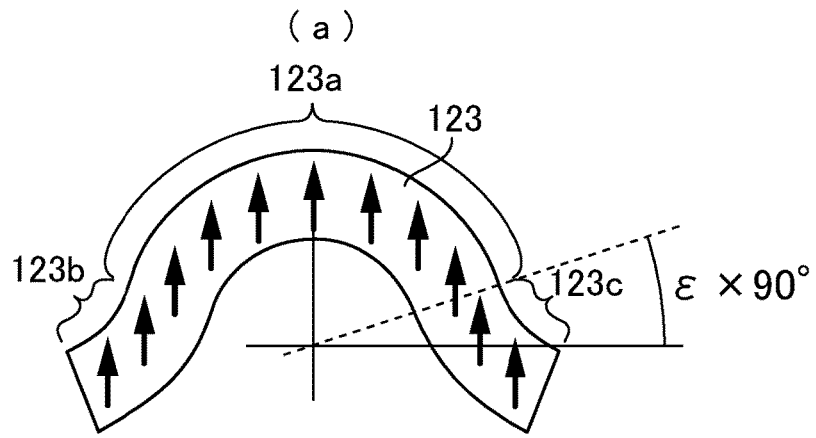
FIG. 10(a) is a sectional view of a processing sheet piece to explain orientation treatment for easy-to-magnetize axes of magnet material particles in a second embodiment of the present invention.

In the second embodiment, as depicted in FIG. 10(a), while the central region 123a of the processing sheet piece 123 is formed in an arc shape, in the same manner as that in the first embodiment, each of the opposite end regions 123b, 123c of the processing sheet piece 123 is formed in an arc shape curved in a direction opposite to that of the central region 123a, instead of a linear shape. Except for the above, the same method as that in the first embodiment may be employed.

[Production of Sintered Body According to Third Embodiment]

Figure 10B:
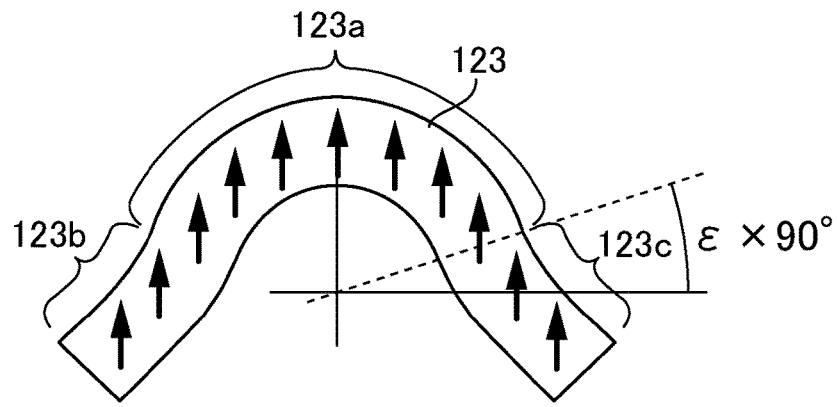
FIG. 10(b) is a sectional view of a processing sheet piece to explain orientation treatment for easy-to-magnetize axes of magnet material particles in a third embodiment of the present invention.

In the third embodiment, as depicted in FIG. 10(b), while the central region 123a of the processing sheet piece 123 is formed in an arc shape, in the same manner as that in the first embodiment, each of the opposite end regions 123b, 123c of the processing sheet piece 123 is formed in a shape corresponding to a curve form changing depending on the angle θ based on a power law. A specific method may comprise numerically-integrating the function expressed by the formula (7), and approximating and determining a shape by the obtained value. Except for the above, the same method as that in the first embodiment may be employed.

As mentioned above, in the present invention, easy-to-magnetize axes of magnet material particles in each of opposite end regions of a rare-earth permanent magnet-forming sintered body are oriented with a deviation from a polar-anisotropic orientation, so that, even in the case where a plurality of permanent magnets each obtained by magnetizing the sintered body are arranged in a ring shape through an inter-end-face gap, it becomes possible to enable a magnetic flux distribution in the vicinity of the inter-end-face gap to come closer to a sinusoidal wave. This makes it possible to reduce cogging torque in a rotary electric machine using this permanent magnet.

LIST OF REFERENCE SIGNS 1, 11, 2: segment magnet
1a, 2a: end face

3: rotor
4: stator
13: end region
14: central region
117: mixture or compound
118: support substrate
119: green sheet
120: slot-die
123: processing sheet piece
125: sintering sheet piece
A: circumferential center point
C: easy-to-magnetize axis
O: curvature center
θ: inclination angle
d: ½ of angular interval of gap g
g: gap

The invention claimed is:

1. A rare-earth permanent magnet-forming sintered body having an integral sintered structure of magnet material particles containing a rare-earth substance, the integral sintered structure being formed in a three-dimensional shape having: a cross-section with a shape defined by a radially outer-side arc-shaped surface having a first curvature radius, a radially inner-side arc-shaped surface having a second curvature radius less than the first curvature radius and having an arc shape concentric with the outer-side arc-shaped surface; and a first end face and a second end face each of which is a radially-extending face along a virtual radial line extending from a curvature center of the arc shapes; and an axial length extending in a direction perpendicular to the cross-section, wherein each of the outer-side and inner-side arc-shaped surfaces has a circumferential length corresponding to an angular region 2ω between the two virtual radial lines defining, respectively, the first and second end faces, and the magnet material particles are magnetized such that, among easy-to-magnetize axes thereof:

easy-to-magnetize axes lying on a central radial line connecting the curvature center and a circumferential center point of the outer-side arc-shaped surface are oriented in a radially outward direction along the central radial line;

easy-to-magnetize axes lying in a central region 2(1−ε)ω, except for opposite end regions defined as two regions each extending over an angular region εω from a respective one of the first and second end faces, are oriented, at a position on an arbitrary radial line located at an angle θ from the central radial line, in a direction deviated from a radially outward direction along the arbitrary radial line, toward the central radial line by an angle Φ; and easy-to-magnetize axes lying in each of the end regions are oriented in a direction deviated radially outwardly at an angle greater than the angle Φ by 5° or more, wherein ε denotes a value falling within the following range: 0.1≤ε≤0.6, and Φ denotes an angle set based on the following formula: Φ=(90°−d)·θ/ω, where d denotes a constant set to an angle falling within the following range: 0°<d≤5°.

2. The rare-earth permanent magnet-forming sintered body as recited in claim 1, wherein the orientation direction of the easy-to-magnetize axes of the magnet material particles in each of the end regions is a direction set based on the following formula: Φ=(1−ε)·(90°−d).

3. The rare-earth permanent magnet-forming sintered body as recited in claim 1, wherein the easy-to-magnetize axes of the magnet material particles in each of the end regions are oriented in a direction set based on the following formula: Φ=(1−ε)·(90°−d)−(Δ/(ε·ω))·(θ−(1−ε)·ω), where Δ denotes a constant falling within the following range: 0<Δ≤(1−ε)·(90°−d).

4. The rare-earth permanent magnet-forming sintered body as recited in claim 1, wherein the easy-to-magnetize axes of the magnet material particles in each of the end regions are oriented in a direction set based on the following formula: Φ=(90°−d)·θ/ω−m·(θ/ω−1+η)$^n$, where m, n and η denote, respectively, a constant falling within the following range: 0<m, a constant falling within the following range: 1<n, and a constant falling within the following range: 0.2≤η≤0.9.

5. A rare-earth permanent magnet obtained by magnetizing the rare-earth permanent magnet-forming sintered body as recited in claim 1.

6. A rotary electric machine comprising a rotor in which a plurality of the rare-earth permanent magnets as recited in claim 5 are circumferentially arranged side-by-side on a circular outer peripheral surface of a rotor core thereof.

7. A rotary electric machine comprising a rotor in which a plurality of the rare-earth permanent magnets as recited in claim 5 are arranged on a circular outer peripheral surface of a rotor core thereof, with an inter-end-face gap which is twice as large as the angle d.

\* \* \* \* \*